July 14, 1964

G. H. FORSYTH ETAL 3,140,863

APPARATUS FOR HEATING POWDERED MATERIAL
SUCH AS RAW CEMENT MATERIAL

Filed Aug. 31, 1962

4 Sheets-Sheet 1

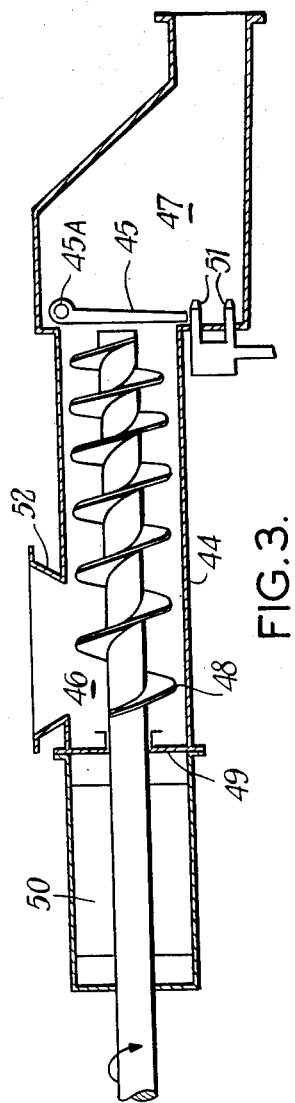
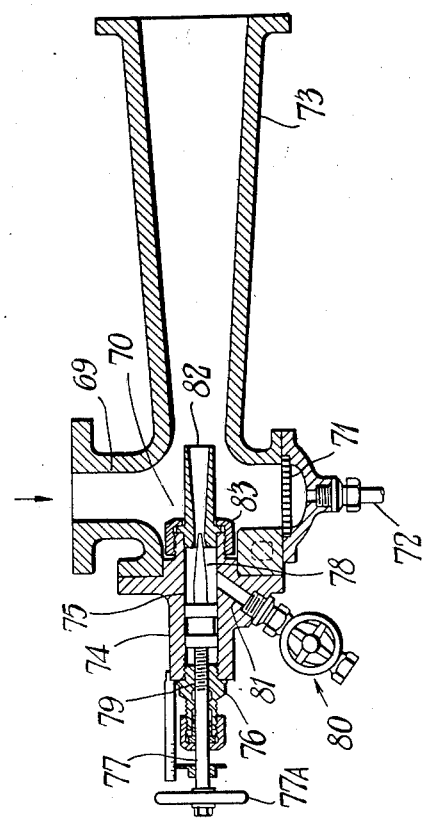

United States Patent Office 3,140,863
Patented July 14, 1964

3,140,863
APPARATUS FOR HEATING POWDERED MATERIAL SUCH AS RAW CEMENT MATERIAL
George Howard Forsyth, Grange-over-Sands, Arthur Lister Ashley, Barrow-in-Furness, and John Cannon Braithwaite, Askam-in-Furness, England, assignors to Vickers-Armstrongs (Engineers) Limited, London, England, a British company
Filed Aug. 31, 1962, Ser. No. 220,841
Claims priority, application Great Britain Aug. 7, 1962
3 Claims. (Cl. 263—21)

This invention relates to apparatus for heating powdered material such as raw cement material.

According to the present invention there is provided apparatus for heating powdered material by means of a stream of hot gases, the apparatus including a plurality of cyclone separators in number greater than two, the separators being disposed side-by-side and connected in series by ducts, each separator having a gas inlet, a gas outlet and a material outlet, there being a duct leading to the gas inlet of a first separator of the series for connecting said first separator to a source of hot gases, and the gas outlet of the last separator being connected to exhaust, each separator apart from the first, having its gas inlet connected by one of said ducts to the gas outlet of the preceding separator of said series whereby a stream of gases from said source passes through each of the separators in turn, and each separator, apart from the first, having its material outlet connected by a material discharge pipe to the duct through which gas is fed to the gas inlet of the preceding separator, there being a pump for transporting material from the material outlet of each separator following the second one to the duct leading to the gas inlet of the preceding separator, and means for feeding material to be heated by said apparatus to the duct connecting the gas inlet of the last separator with the gas outlet of the last but one separator, the material outlet of the first separator serving for delivering the heated material.

Figure 1:
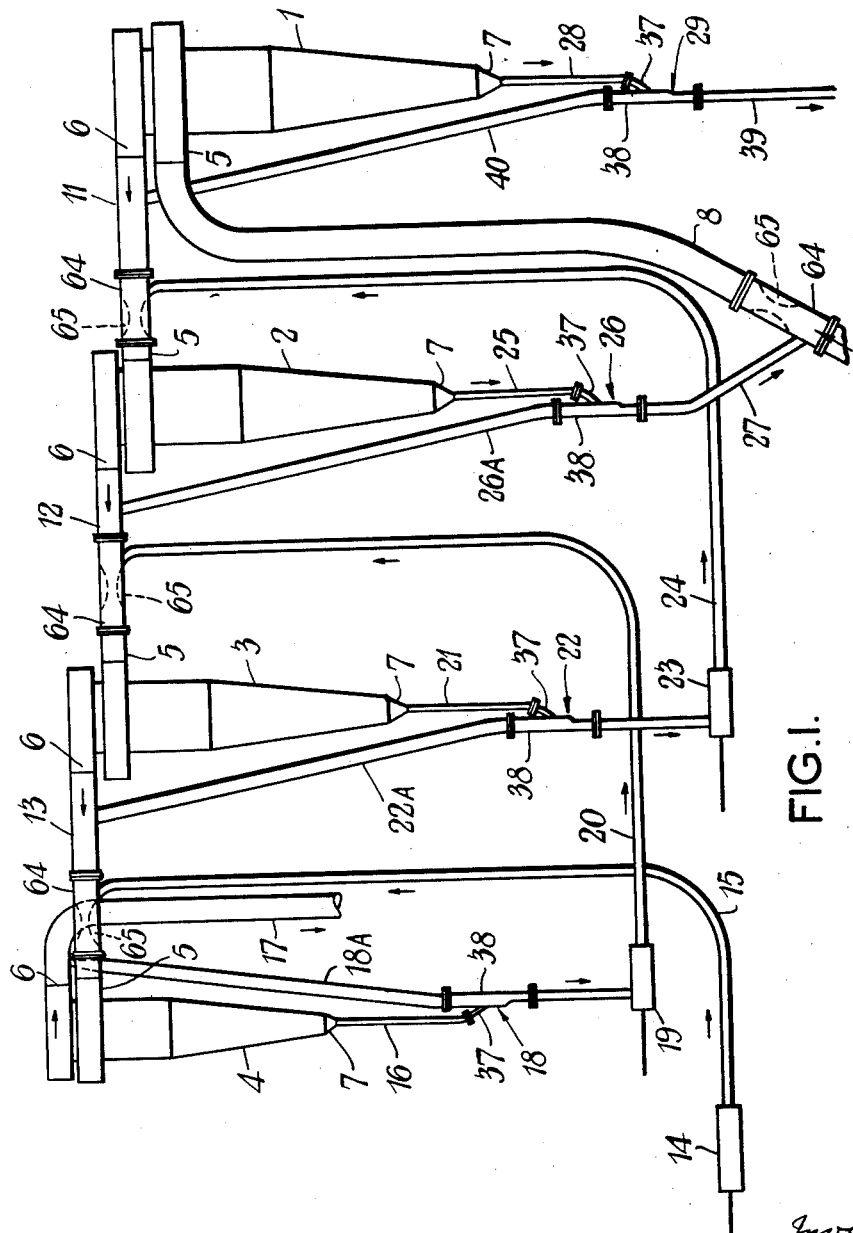
Figure 2:
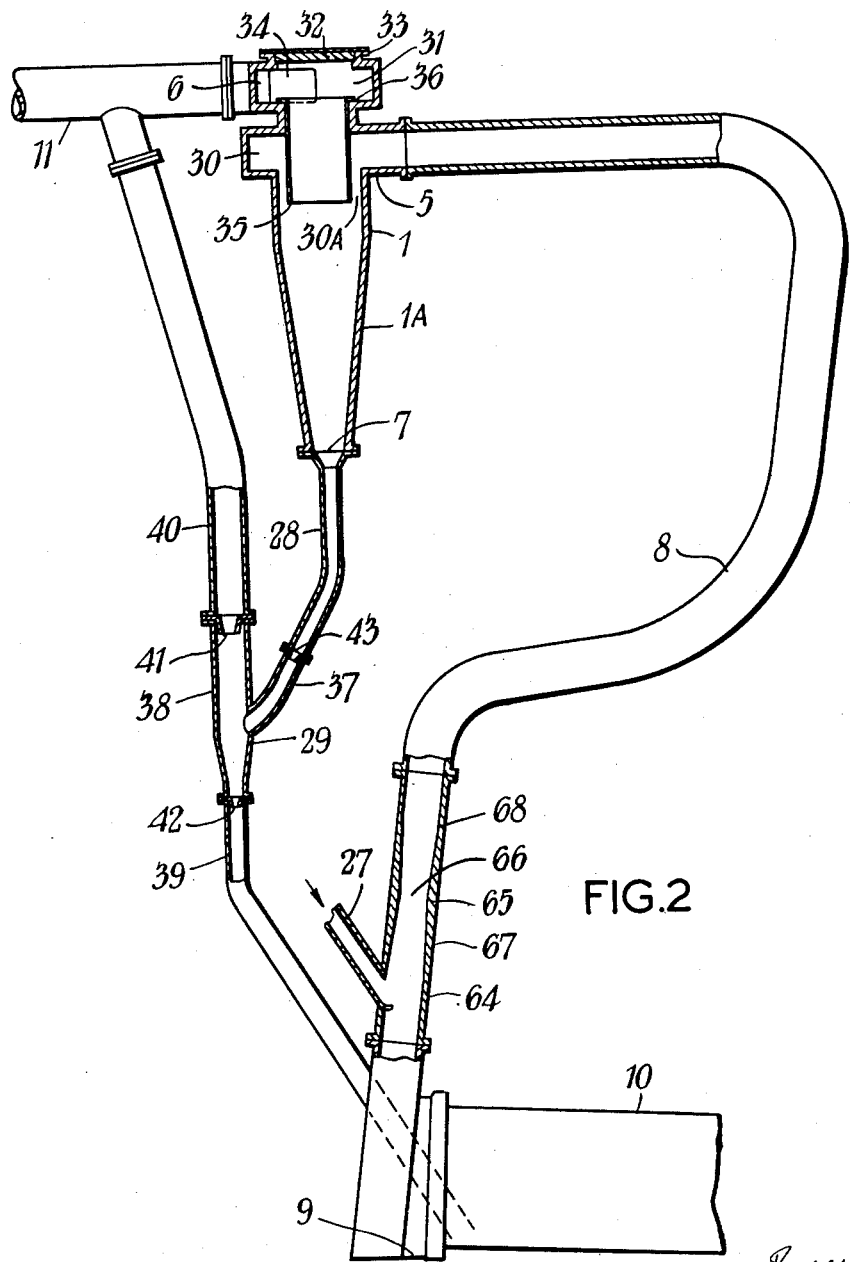
Figure 4:
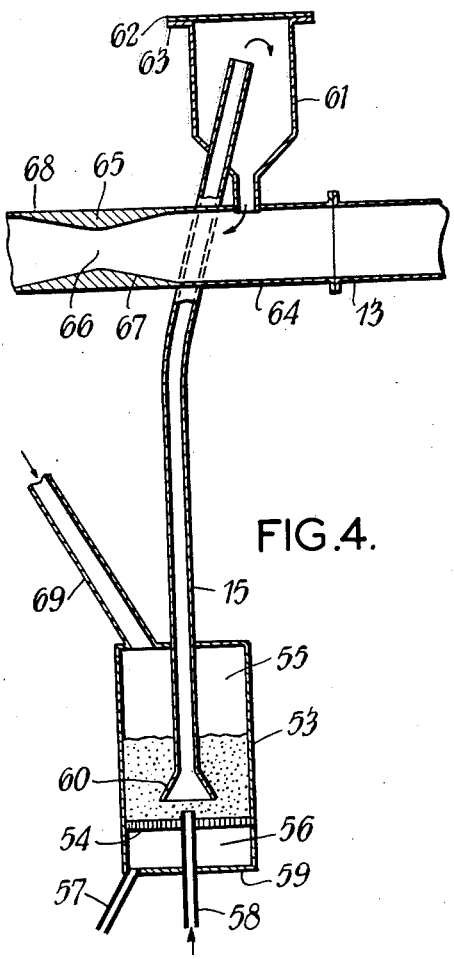

For a better understanding of the invention and to show how the same may be carried into effect reference will now be made, by way of example, to the accompanying drawings in which:

FIGURE 1 is a diagram of apparatus for heating powdered material such as raw cement material, FIGURE 2 is a diagram, to an enlarged scale and partly in section, of part of the apparatus shown in FIGURE 1, together with part of a kiln, FIGURE 3 is a diagrammatic, longitudinal, sectional view of a pump suitable for use in the heating apparatus of FIGURE 1, FIGURE 4 is a diagrammatic sectional view of another pump suitable for use in the heating apparatus of FIGURE 1, and FIGURE 5 is a longitudinal cross-section of a further pump suitable for use in the heating apparatus of FIGURE 1.

Referring to FIGURES 1 and 2, the heating apparatus includes a plurality of cyclone separators 1, 2, 3 and 4 for separating gases from powdered material. The separators 1 to 4 have their axes vertical and each has a gas inlet 5 (see FIG. 2), a gas outlet 6 and an outlet 7 for the material separated from gases in the separators 1 to 4.

The gas inlet 5 of the separator 1 is connected by a duct 8 to a stationary flue structure diagrammatically illustrated at 9, of a rotary kiln 10 (see FIG. 2). The gas outlet 6 of the separator 1 is connected by a duct 11 to the gas inlet 5 of the separator 2, and the gas outlet of the separator 2 is connected by a duct 12 to the gas inlet 5 of the separator 3. In a similar manner the gas outlet of the separator 3 is connected by a duct 13 to the gas inlet of the separator 4. As will be seen from FIGURE 1, the separators 1 to 4 are arranged side-by-side and the ducts 11, 12 and 13 extend substantially horizontally from the gas outlet of one separator to the gas inlet of the next. The gas outlet of the separator 4 is connected to a waste gas duct 17 which leads to a dust separator (not shown) such as an electrostatic precipitator or a cyclone separator, and to a fan (not shown) which serves to draw gas through the apparatus.

A pump 14 for feeding raw powdered material into the apparatus has its delivery side connected to a pipe 15 which opens into the duct 13. The outlet 7 of the separator 4 is connected by way of a material discharge pipe 16 and a gas trap 18 to the intake side of a pump 19. The delivery side of the pump 19 is connected to a pipe 20 which opens into the duct 12 leading to the separator 3. The outlet 7 of the separator 3 is connected by way of a material discharge pipe 21 and a gas trap 22 to the intake side of a pump 23, and the delivery side of the pump 23 is connected to a pipe 24 which opens into the duct 11 leading to the separator 2. A material discharge pipe 25 of the separator 2 is connected through a gas trap 26 to a pipe 27 which opens into the duct 8 leading from the flue structure 9 to the gas inlet 5 of the separator 1. A material discharge pipe 28 of the separator 1 leads via a gas trap 29 to the rotary kiln 10.

The separators 1 to 4 are of the same construction and the separator 1 is shown in more detail in FIGURE 2. The separator 1 has a casing 1A of elongated form which, in planes perpendicular to the direction of its elongation, is of substantially circular cross-section. The casing 1A is formed towards the upper part thereof with two portions which are of greater diameter than the remainder of the casing thereby to produce two chambers 30 and 31 separated by a necked portion of the casing. The inlet 5 opens tangentially into the chamber 30 and the outlet 6 is arranged tangentially with respect to the chamber 31. The outlet 7 is at the bottom of the casing. The upper end of the casing 1A is open and a cover plate 32 is provided which is secured to an upper flange 33 of the casing 1A. The underside of the cover 32 carries a layer of heat insulating material 34. The chamber 30 is connected to the chamber 31 by way of a tube 35 which has a radially outwardly directed flange 36 at the upper end thereof. The flange 36 seats on the bottom of the chamber 31 and supports the tube 35 in a position in which it extends downwardly through the chamber 30 into the part of the casing below said upper part. The part of the casing in which the lower end of the tube 35 lies communicates with the chamber 30 via an annular space 30A which is formed around the tube 35. The tube 35 may be removed from the separator through the open top of the casing when the cover 32 and the layer 34 have been removed. The opening at the upper end of the casing 1A also permits access to the refractory lining of the separator 1.

The gas trap 29 is of the same construction as the gas traps 18, 22 and 26. The trap 29 includes a vertical pipe 38 and a branch pipe 37 (FIGURE 2) which is connected to the material discharge pipe 28. The lower end of the pipe 38 is connected to a feed pipe 39 leading to the rotary kiln 10 and the upper end of the pipe 38 is joined by way of a pipe 40 to the duct 11. The pipe 40 connects the upper end of the pipe 38 of the trap 29 to a zone which, in operation of the apparatus, is at a lower pressure than that of the zone to which the upper end of the branch pipe 37 is connected. The cross-sectional area of the upper end of the pipe 38 is greater than that of its lower end. The upper ends of the pipes 38 of the traps 18, 22 and 26 are respectively connected to the duct 17 by a pipe 18A, the duct 13 by a pipe 22A and the duct 12 by a pipe 26A. Downwardly converging nozzles 41, 42 and 43 are provided at the upper and lower ends of the pipe 38 and at the junction between the pipe 37 and the pipe 28. Outwardly directed flanges on the nozzles are clamped between flanges on the ends of the pipes 28 and 37, 38 and 39, and 38 and 40. This gas trap forms the subject of our co-pending patent application No. 220,840 filed herewith on August 31, 1962.

The pumps 14, 19 and 23 may be constructed as shown in FIGURE 3, FIGURE 4 or FIGURE 5.

The pump shown in FIGURE 3 has an elongated casing 44 which is effectively divided by a flap valve 45 into two chambers 46 and 47. A feed screw 48 is provided in the chamber 46, the feed screw extending through an end wall 49 of the casing 44 and having a shaft portion thereof supported in a bearing arrangement, the shaft portion being connected to a motor (not shown) for driving the screw 48. The bearing arrangement is diagrammatically illustrated at 50. Nozzles connected to a source (not shown) of compressed air are provided in the chamber 47 at locations immediately below the flap valve 45. One or more nozzles may be provided and the pump of FIGURE 3 has two nozzles 51.

The pump shown in FIGURE 4 will be described when incorporated in the apparatus of FIGURE 1 as pump 14. The pump includes a casing 53, the interior of the casing being divided by an air-permeable plate 54 into an upper chamber 55 and a lower chamber 56. The lower chamber 56 is connected by way of a pipe 57 to a source of air under pressure. A pipe 58 passes vertically through the lower end wall 59 of the casing 53 and through the plate 54 to terminate at a point which is slightly above the upper surface of the plate 54. The pump outlet is constituted by the pipe 15 which has a flared lower end 60, the lower end 60 being disposed above the upper end of the pipe 58. The upper end of the pipe 15 opens into a casing 61 carried by the duct 13, and the lower end of the casing 61 opens into the duct 13. The upper end of the casing 61 is closed by a horizontal plate 62 bolted to a flange 63 of the casing 61.

The pump shown in FIGURE 5 has an inlet 69 for powdered material, the inlet 69 communicating with a chamber 70. The bottom of the chamber 70 is constituted by an air permeable plate 71 to the underside of which air under pressure is directed through a pipe 72. The pump outlet is constituted by a divergent pipe 73 the narrower end of which is connected to the chamber 70. A member 74 having a bore 75 therethrough is provided at a location on the side of the chamber 70 opposite the pipe 73. The bore 75 is closed at the end thereof remote from the chamber 70 by a plug member 76 through which a spindle 77 co-axial with the bore 75 is passed. The spindle 77, which carries a wheel 77A at one end thereof and a needle 78 at the other end thereof, has a screw threaded portion 79 which is in engagement with mating screw threading of the member 76. Rotation of the spindle 77 causes movement of the same axially of the bore 75. Air under pressure is supplied to the bore 75 by way of a connector and valve arrangement 80 and a passage 81 in the member 74. A nozzle 82 having a divergent bore is secured by a cap 83 to the member 74 with the larger diameter end of the bore of the nozzle at the region where the pipe 73 joins the chamber 70. The larger diameter end of the nozzle may be covered by a plate (not shown) having a plurality of apertures there so that a number of jets of air issue from the nozzle.

The ducts 8, 11, 12 and 13 each include a section 64. The interior wall of the section 64 is lined with refractory material which is locally thickened at 65 thereby to form in the bore of the section 64, a portion 67 which converges towards a throat 66, the throat being followed by a divergent portion 68. The pipes 15, 20, 24 and 27 are each connected to the associated section 64 on the side of the convergent portion 67 remote from the throat 66. The convergent-divergent sections 64 are provided for improving heat transfer between the gases and powdered material which flow through the sections 64 in use of the apparatus.

In use of the apparatus described above hot waste gases from the kiln 10 are drawn through the flue structure 9 of the kiln and the duct 8 to the inlet 5 of the separator 1. The tangential arrangement of the inlet 5 causes the gases to be set into whirling motion as they enter the separator 1. The whirling gases pass from the chamber 30 through the tube 35 to the chamber 31 from whence the gases flow via the outlet 6 of the separator 1 to the duct 11 which leads to the separator 2. The outlet 6 is directed so that the whirling gases flow smoothly into the outlet. It will be understood that the gases then pass in turn through the separators 2, 3 and 4 by way of the ducts 12 and 13 to the outlet duct 17.

The cold powdered material to be heated is fed by the pump 14 from a supply (not shown) of material and is lifted by a pump 14 from the level at which the pump is disposed to the level of the duct 13. The material enters the duct 13 at a point upstream of the convergent portion 67 in the section 64 of the duct 13. If the pump 14 is of the construction shown in FIGURE 3, the material enters the pump through an inlet 52 and is fed by the screw 48 along the chamber 46. The material fed by the screw 48 causes the flap valve 45 to swing about its pivot 45A and material passes from the chamber 46 to the chamber 47. The compressed air fed through the nozzles 51 entrains the material entering the chamber 47 from the chamber 46 and carries the same along the pipe 15. The material being fed by the screw 48 acts, when the flap valve 45 is open, as a seal preventing flow of compressed air from the chamber 47 to the inlet 52.

Alternatively, if the pump 14 is constructed as shown in FIGURE 4, material enters the upper chamber 55 of the casing 53 by way of a pipe 69. Air is fed through the pipes 57 and 58, the air fed through the pipe 57 entering the chamber 56 which is maintained substantially free of powdered material by the plate 54 and passing through the plate 54 thereby to "fluidise" material in the chamber 55. The fluidised material is entrained by air fed through the pipe 58 and is carried up the pipe 15 and discharged from the upper end of the pipe 15 into the casing 61. The material passes from the casing 61 into the section 64 of the duct 13. The casing 61 may be provided with a valve (not shown) for bleeding air that has transported powdered material to the casing from the casing 61 thereby to prevent undue cooling of the gases flowing along the duct 13. The material entering the duct 13 is entrained by the gases passing along the duct 13 and is carried thereby through the section 64.

In use of the pump shown in FIGURE 5 air is fed through the nozzle 82 from the bore 75 at a rate which can be adjusted by the setting of the needle 78. A jet of air rushes from the nozzle 82 and causes the pressure in the chamber 70 to be lower than the pressure prevailing in the inlet pipe 69 and hence powdered material is drawn into the chamber 70 from the pipe 69. Air fed into the chamber 70 through the plate 71 serves to fluidise the material in the chamber 70 and prevents a layer of material building up at the bottom of the chamber 70. The fluidised material is drawn from the chamber 70 by the air flowing from the nozzle 82 and is discharged through the pipe 73.

Relative movement between the material and the gases occurs as the gases enter the portion 67, the speed of the gases increasing to a greater extent than the speed of the material. Similarly, as the gases enter the portion 68 they slow down more rapidly than does the powdered material whereby further relative movement between the material and the gases occurs. The induced relative movement between the gases and the material improves transfer of heat from the gases to the material. The gases and the material then enter the separator 4. The material and the gases are separated one from the other in the separator 4 and the material is discharged from the separator 4 through the pipe 16 and the trap 18 and the gases pass to the waste gas duct 17. The trap 18 serves to prevent gases being fed to the separator 4 through the material discharge pipe 16. The material flows from the trap 18 to the inlet of the pump 19 and is lifted by the pump 19 through the pipe 20 to the level of the duct 12. It will be understood that the gases passing through the duct 12 entrain and further heat the material and carry it to the separator 3. The material is then separated from the gases once more and passes through the pipe 21 via the trap 22 to the pump 23 which forces the material up the pipe 24 to the level of the duct 11. The material is further heated and carried into the separator 2 by the gases passing along the duct 11. In the separator 2 the powdered material is separated from the gases. The material is passed from the separator 2 via the pipe 25, the trap 26 and the pipe 27 to the duct 8. The gases passing along the duct 8 directly from the structure 9 of the kiln 10 still further heat the powdered material and carry the latter upwardly into the separator 1. The heated powdered material discharged from the lower end of the separator 1 passes through the trap 29 and the pipe 39, and enters the kiln 10. The pipe 38 of the trap 29 is connected by the pipe 40 to the duct 11 in which the pressure is lower than the pressure prevailing in the separator 1 to which the pipe 37 is connected. The pressure in the kiln 10 is higher than the pressure in the duct 11 and in the separator 1 so that there is a tendency for gases to flow from the pipes 37 and 39 to the lower end of the pipe 40. Such flow carries a certain amount of powdered material from the pipe 37 to the pipe 40 and heads of fluidised material build up in the lower end of the pipe 40, in the pipe 38 and in the pipe 37. The heads of fluidised material substantially balance the differences in pressure between the kiln 10 and the duct 11 and the separator 1 whereby upward flow of gases is reduced to the small amount necessary to maintain the particles of powder in suspension. However, further material flowing by gravity from the separator down the pipe 28 results in an equivalent amount of material flowing down the pipe 39 to the kiln 10. The traps 18, 22 and 26 operate in a manner similar to the trap 29.

When pumps of the forms shown in FIGURES 3, 4 or 5 are fitted as pumps 19 and 23 the traps 18 and 22 may not be required since these pumps may produce sufficient suction head in the pipes 16 and 21. In this case pipes 18A and 22A will also be omitted and powdered material will flow from separators 4 and 3 via pipes 16 and 21 to the inlet pipe 69 of the pumps 19 and 23 respectively. Traps 26 and 29 will still be required since flow of powdered material down pipes 27 and 39 is not pumped.

We claim:

1. Apparatus for heating powdered material by means of a stream of hot gases, the apparatus comprising a series of closely spaced cyclone separators in number greater than two, each separator having a gas inlet, a gas outlet, and a material outlet, said series of cyclone separators having adjacent separators disposed in substantially side-by-side relationship to each other with the inlet of one separator having an axis coincident with an axis of the outlet of an adjacent separator apart from the first separator in the series, a source of hot gases, a duct connecting the gas inlet of the first separator of the series to the source of hot gases, a duct connecting the gas inlet of each separator, apart from the first, to the gas outlet of the next preceding separator of the series, said last-mentioned duct having an axis arranged substantially coincident with the axis of the gas inlet and the axis of the gas outlet whereby gas flow takes the shortest linear path between the gas inlet and gas outlet connected thereby, a duct connecting the gas outlet of the last separator of the series to exhaust, a material discharge pipe leading from the material outlet of each separator, each material discharge pipe, apart from that leading from said first separator, being connected to the duct through which gas is fed to the next preceding separator of the series, pump means for raising material from the material outlet of each separator following the second separator of the series to the duct leading to the gas inlet of the next preceding separator of the series, and means for feeding material to be heated by said apparatus to the duct leading to the gas inlet of the last separator of the series, the material outlet of the first separator serving for delivering heated material.

2. Apparatus for heating powdered material by means of a stream of hot gases, the apparatus comprising a series of cyclone separators in number greater than two with adjacent separators disposed side-by-side, each separator having a gas inlet, a gas outlet, and a material outlet, a source of hot gases, a duct connecting the gas inlet of the first separator of the series to the source of hot gases, a horizontally extending duct connecting the gas inlet of each separator, apart from the first, to the gas outlet of the next preceding separator of the series whereby gases from said source pass through the separators in succession, a duct connecting the gas outlet of the last separator of the series to exhaust, a material discharge pipe leading from the material outlet of each separator, each material discharge pipe, apart from that leading from said first separator, being connected to the duct through which gas is fed to the next preceding separator of the series, pump means for raising material from the material outlet of each separator following the second separator of the series to the duct leading to the gas inlet of the next preceding separator of the series, and means for feeding material to be heated by said apparatus to the duct leading to the gas inlet of the last separator of the series, the material outlet of the first separator serving for delivering heated material.

3. Apparatus for heating powdered material by means of a stream of hot gases, the apparatus comprising a series of cyclone separators in number greater than two with adjacent separators disposed side-by-side, each separator comprising a casing having an upper end portion provided with an opening at its upper end, a detachable cover for closing said opening, the upper end portion of the casing including a necked portion and first and second chambers, the chambers being separated by said necked portion and being disposed one above the other, said first chamber for the separator having a gas inlet opening and said second chamber having a gas outlet opening, a tube disposed in said casing and removable from the casing through said opening at the top of the casing upon removal of the cover, and said tube extending downwardly from the necked portion through said second chamber and terminating at a location below said second chamber to define a gas flow path from the first chamber to the second chamber through said tube, a source of hot gases, a duct connecting the gas inlet of the first separator of the series to the source of hot gases, a duct connecting the gas inlet of each separator, apart from the first, to the gas outlet of the next preceding separator of the series whereby gases from said source pass through the separators in succession, a duct connecting the gas outlet of the last separator of the series to exhaust, a material discharge pipe leading from the material outlet of each separator, each material discharge pipe, apart from that leading from said first separator, being connected to the duct through which gas is fed to the next preceding separator of the series, pump means for raising material from the material outlet of each separator following the second separator of the series to the duct leading to the gas inlet of the next preceding separator of the series, and means for feeding material to be heated by said apparatus to the duct leading to the gas inlet of the last separator of the series, the material outlet of the first separator serving for delivering heated material.

References Cited in the file of this patent
UNITED STATES PATENTS

| | | |
|---|---|---|
| 1,100,435 | Lance | June 16, 1914 |
| 2,757,921 | Petersen | Aug. 7, 1956 |
| 2,790,838 | Schrader | Apr. 30, 1957 |
| 2,816,490 | Boadway et al. | Dec. 17, 1957 |
| 2,932,498 | Metcalfe | Apr. 12, 1960 |